(12) United States Patent
Yamasaki

(10) Patent No.: US 7,171,523 B2
(45) Date of Patent: Jan. 30, 2007

(54) INFORMATION PROCESSING SYSTEM FOR UPDATING DATA IN A SHARED NETWORK STORAGE SYSTEM

(75) Inventor: Yasuo Yamasaki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 14 days.

(21) Appl. No.: 10/219,284

(22) Filed: Aug. 16, 2002

(65) Prior Publication Data

US 2003/0188109 A1    Oct. 2, 2003

(30) Foreign Application Priority Data

Mar. 28, 2002    (JP)    ............................ 2002-090878

(51) Int. Cl.
*G06F 12/00*    (2006.01)
(52) U.S. Cl. ..................... 711/147; 711/148
(58) Field of Classification Search ........ 711/111–114, 711/147, 148
See application file for complete search history.

(56) References Cited

U.S. PATENT DOCUMENTS

| | | | |
|---|---|---|---|
| 5,319,761 A * | 6/1994 | Chiarot et al. .............. | 711/207 |
| 5,404,478 A * | 4/1995 | Arai et al. .................. | 711/206 |
| 5,535,411 A * | 7/1996 | Speed et al. ................ | 713/2 |
| 5,615,330 A * | 3/1997 | Taylor .......................... | 714/7 |

OTHER PUBLICATIONS

"The Design and Implementation of the 4.4 BSD Operating System", M.K. McKusick et al, 1996, pp. 235-237.

* cited by examiner

*Primary Examiner*—Than Nguyen
(74) *Attorney, Agent, or Firm*—Mattingly, Stanger, Malur & Brundidge, P.C.

(57) ABSTRACT

When a large number of computer disk devices are to be shared, partially different disk devices cannot be flexibly shared at a lower level of the operating system. As a solution, a disk sharing module consisting of a read routine and a write routine is provided between a file system module and a disk access module within the operating system. The write routine translates writes into a common disk device to writes into a private disk device, and stores update information in a private table within the private disk device. The read routine references the private table of the private disk device to translate reads from the common disk device into reads from the common disk device 120 or private disk device as appropriate.

8 Claims, 6 Drawing Sheets

FIG. 3

PRIVATE TABLE

| PRIVATE BLOCK NUMBER | VALIDITY FLAG | COMMON BLOCK NUMBER |
|:---:|:---:|:---:|
| 0 | 1 | 9 |
| 1 | 1 | 10 |
| 2 | 1 | 11 |
| 3 | 1 | 45 |
| 4 | 1 | 46 |
| 5 | 0 | — |
| 6 | 0 | — |
| 7 | 0 | — |
| ⋮ | ⋮ | ⋮ |

310　　　320　　　330

0 : VALID
1 : INVALID

INFORMATION PROCESSING SYSTEM FOR UPDATING DATA IN A SHARED NETWORK STORAGE SYSTEM

BACKGROUND OF THE INVENTION

1. Field of the Invention

The present invention relates to an information processing system in which computers are connected to respective disk devices.

2. Description of Related Art

In a conventional computer system, multiple computers were interconnected via a LAN or other network and disk devices were directly connected to the computers. The data stored in the disk devices were managed by the computers that were directly connected to them. In other words, the data were distributed for management purposes.

Recently, however, there is an increase in the number of configurations in which multiple computers share a disk device, including a configuration for sharing input/output channels for virtual computing and computer logical sharing, a storage area network (hereinafter abbreviated to "SAN"), and a network attached storage (hereinafter abbreviated to "NAS"). These configurations offer the advantage of reducing the cost of disk devices as well as the cost of management, because they make it possible to integrate the data distributed to multiple disk devices for centralized management purposes.

The operating system function called "Union File Mount", which is stated on pages 235 through 237 of Addison Wesley's "The Design and Implementation of the 4.4BSD Operating System (1996)", provides a means of partial sharing by saving the updates for a file system established on a disk device onto another disk device.

All the above-mentioned conventional technologies provide a means of sharing user disks and a part of system disk, but do not permit the entire system disk to be shared. The reason is that individual computers have their own unique items such as a configuration file.

When, for instance, a NAS or other network file system is used, flexible operations cannot be performed because there is no alternative but to define common and private parts in the unit of a directory and only partial sharing is achievable.

The "Union File Mount" function, on the other hand, permits partial sharing. However, the function does not become available until the operating system is completely started up because it relates to the file system, which is an upper layer of the operating system. Therefore, it cannot be applied to the boot disk.

In a system used at a data center or the like, where a large number of similarly configured computers operate, the contents of system disks are mostly the same but not perfectly the same. Therefore, the computers are provided with system disks that devote most of their spaces to the storage of the same information. That is why the device cost and management cost cannot easily be reduced.

SUMMARY OF THE INVENTION

The object of the present invention is to let multiple computers share the common portions of system disk devices and other disk devices the contents of which are not perfectly the same, and offer a sharing function at a lower level of the operating system to permit boot disk sharing.

In carrying out our invention in one preferred mode, we utilize an information processing system having: computers connected to their respective private disk devices, a common disk device commonly connected to the computers, a means for storing writes into said common disk device into said private disk devices to permit said computers to share the data in said common disk device, and a means for translating reads of said common disk device into reads of said private disk devices or said common disk device.

Other and further objects, features and advantages of the invention will appear more fully from the following description.

BRIEF DESCRIPTION OF THE DRAWINGS

FIG. 3 shows the private table structure of a preferred embodiment of the present invention;

DETAILED DESCRIPTION OF THE PREFERRED EMBODIMENTS

The embodiments of disk sharing in a virtual machine environment of the present invention are detailed below with reference to drawings.

Figure 1:
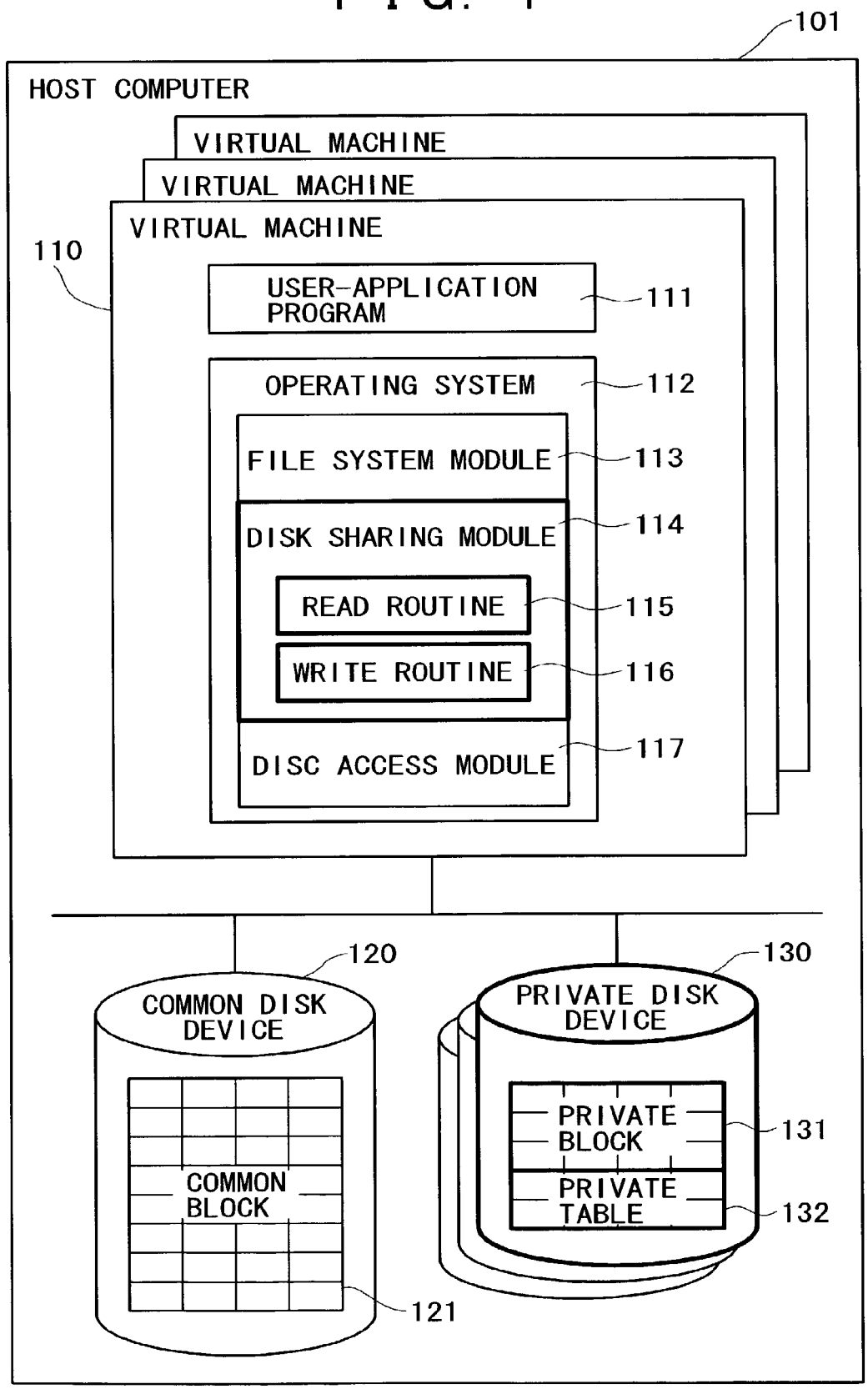
FIG. 1 is a schematic diagram of a preferred embodiment of the present invention.

FIG. 1 is a schematic diagram of an information processing system of the present invention. A host computer 101 contains a virtual machine 110, a common disk device 120, and a private disk device 130. The common disk device 120 is only one device within the host computer 101 and shared by multiple virtual machines. One unit of private disk device 130 is required for each virtual machine and used exclusively by a virtual machine. If a large number of virtual machines exist, multiple common disk devices can be furnished to prevent the performance from being degraded by common disk device access. A user program 111 and an operating system 112 operate within the virtual machine 110. The operating system 112 controls the common disk device 120 and private disk device 130, and provides the user program 111 with a file access function. There are a file system module 113, a disk sharing module 114, and a disk access module 117 within the operating system 112. The file system module 113 translates file access requests from the user program 111 into block-specific inputs/outputs relative to disk devices and passes them to the disk sharing module 114. The disk sharing module 114, the software that is a feature of the present invention, offers a disk sharing function as it receives block-specific input/output requests from the file system module 113, translates them into appropriate block-specific input/output requests for the common disk device 120 and private disk device 130, and passes them to the disk access module 117. (A typical preferred embodiment is such that the common disk device 120 is a system disk for storing the information common to individual computers whereas the private disk device 130 is a system disk for storing the information unique to a specific computer. Common data and private data can also be stored in the same manner for user disk management.) The disk access module 117 receives block-specific input/output requests from the disk sharing module 114, controls the common disk device 120 and private disk device 130, and processes block-specific physical inputs/outputs relative to the disk devices. The disk sharing module 114 consists of a read routine 115 and a write routine 116. The read routine 115 translates the input portions of block-specific input/output requests to be translated by the disk sharing module 114. The write routine 116 translates the output portions of block-specific input/output requests to be translated by the disk sharing module 114. The common disk device 120 contains common blocks 121. The common blocks 121 form an area for storing data that is common to multiple virtual machines. A private disk device 130 contains private blocks 131 and a private table 132. The private blocks 131 form an area for storing data that is unique to a specific virtual machine. The private table 132 is an area for storing information that indicates what data in the common disk device 120 is replaced and where in a private disk device 130 the replaced data is stored.

Figure 2:
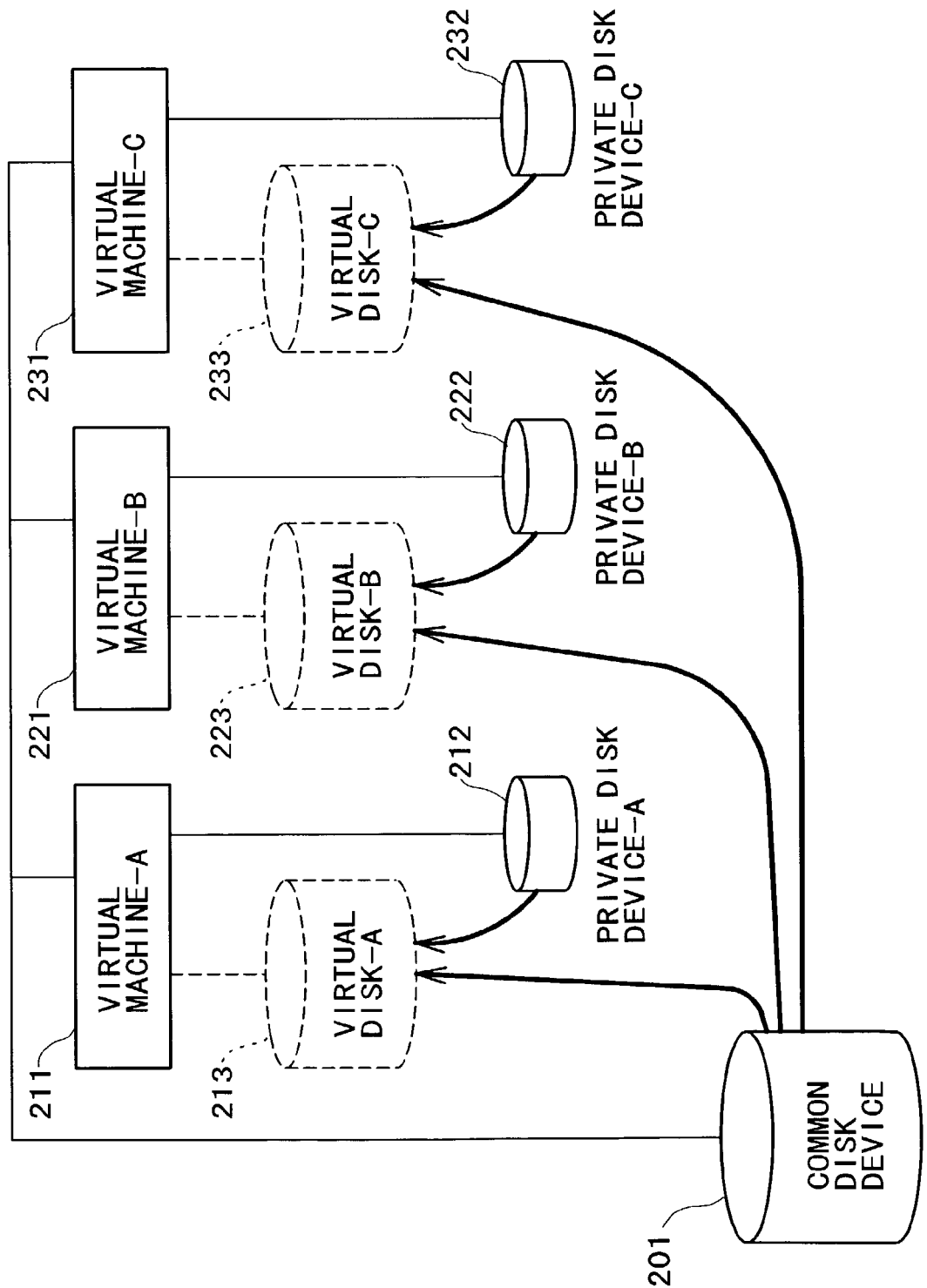
FIG. 2 shows a virtual disk configuration image of a preferred embodiment of the present invention.

FIG. 2 shows how disks are shared when there are three units of virtual machines. The virtual machines share the common disk device 201 for read operations only. Virtual machine A 211, virtual machine B 221, and virtual machine C 231 exclusively use private disk device A 212, private disk device B 222, and private disk device C 232, respectively, for read/write operations. Virtual disk A 213, virtual disk B 223, and virtual disk C 233 are virtual disk devices that are exclusively used by virtual machine A, virtual machine B, and virtual machine C, respectively. The virtual disks are visible to the virtual machines as if they really exist. The contents of the virtual disks are initially the same as those of the common disk device. The contents of the virtual disks can be updated by the virtual machines and the private disks store the updated portions.

When the above configuration is used, only the contents of the common disk device 201, and private disk devices A 212, B 222, and C 232 are to be backed up. There is no need to back up the entire contents of virtual disks A 213, B 223, and C 233.

FIG. 3 shows the structure of the private table and its typical use. The private table stores the information about the status of all private blocks. Column 310 indicates private block numbers. Column 320 shows validity flags, which indicate whether private blocks are used. Column 330 indicates common block numbers, which represent private block replacement destinations. For example, private block No. 0 is used for replacing common block No. 9 and private block No. 5 is not used.

Figure 4:
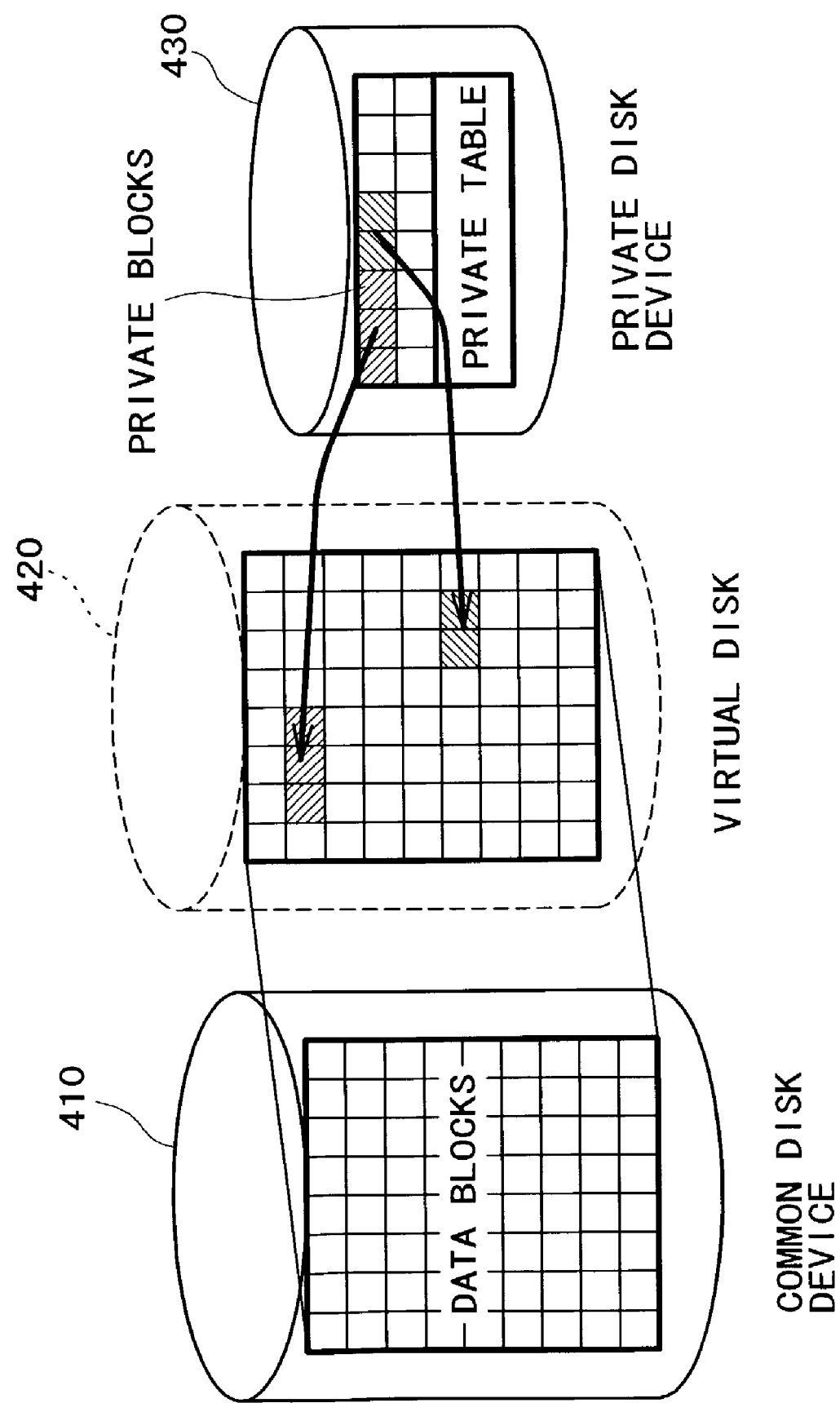
FIG. 4 shows a typical relationship between a private table and a virtual disk of a preferred embodiment of the present invention.

FIG. 4 shows a typical virtual disk configuration for private table use indicated in FIG. 3. This configuration example shows a common disk device 410, a virtual disk 420, and a private disk device 430. The contents of the virtual disk 420 are nearly the same as those of the common disk device 410. However, the contents of blocks No. 9 through 11 are replaced by the contents of private blocks No. 0 through 2 of the private disk device 430, and the contents of blocks No. 45 and 46 are replaced by the contents of private blocks No. 3 and 4 of the private disk device 430.

Figure 5:
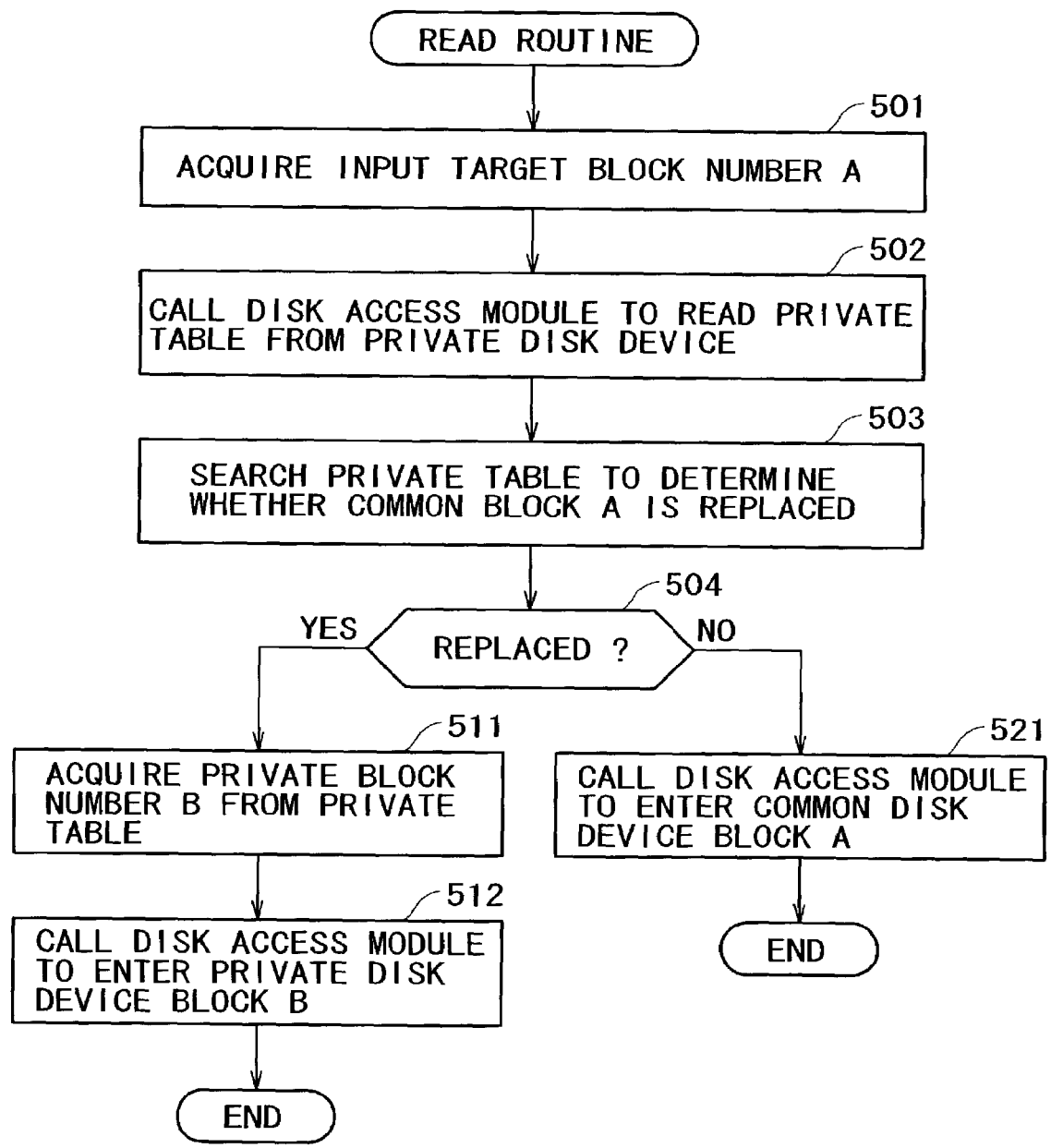
FIG. 5 shows a read routine flowchart of a preferred embodiment of the present invention.

FIG. 5 shows a read routine flowchart. In step 501, block number A is acquired as the input target. Block number A is designated by a caller. In step 502, the disk access module 117 is called. As a result of this call, a private table 132 is read from a private disk device 130. In step 503, the private table 132 is searched. This search is conducted to determine whether input target block A is replaced. More specifically, all entries in the private table 132 are checked. If an entry is found to have a validity flag value of 1 and a common block number of A, it means that block A is replaced. In step 504, a branch occurs in accordance with the judgment result. The program branches to step 511 when block A is replaced. If not, the program branches to step 521. In step 511, private block B is acquired. The block number of private block B is the private block number of an entry that was retrieved by a search in step 503. In step 512, the disk access module 117 is called. As a result of this call, data is read from block B of the private disk device 130. In step 521, the disk access module 117 is called. As a result of this call, data is read from block A of the common disk device 120.

Figure 6:
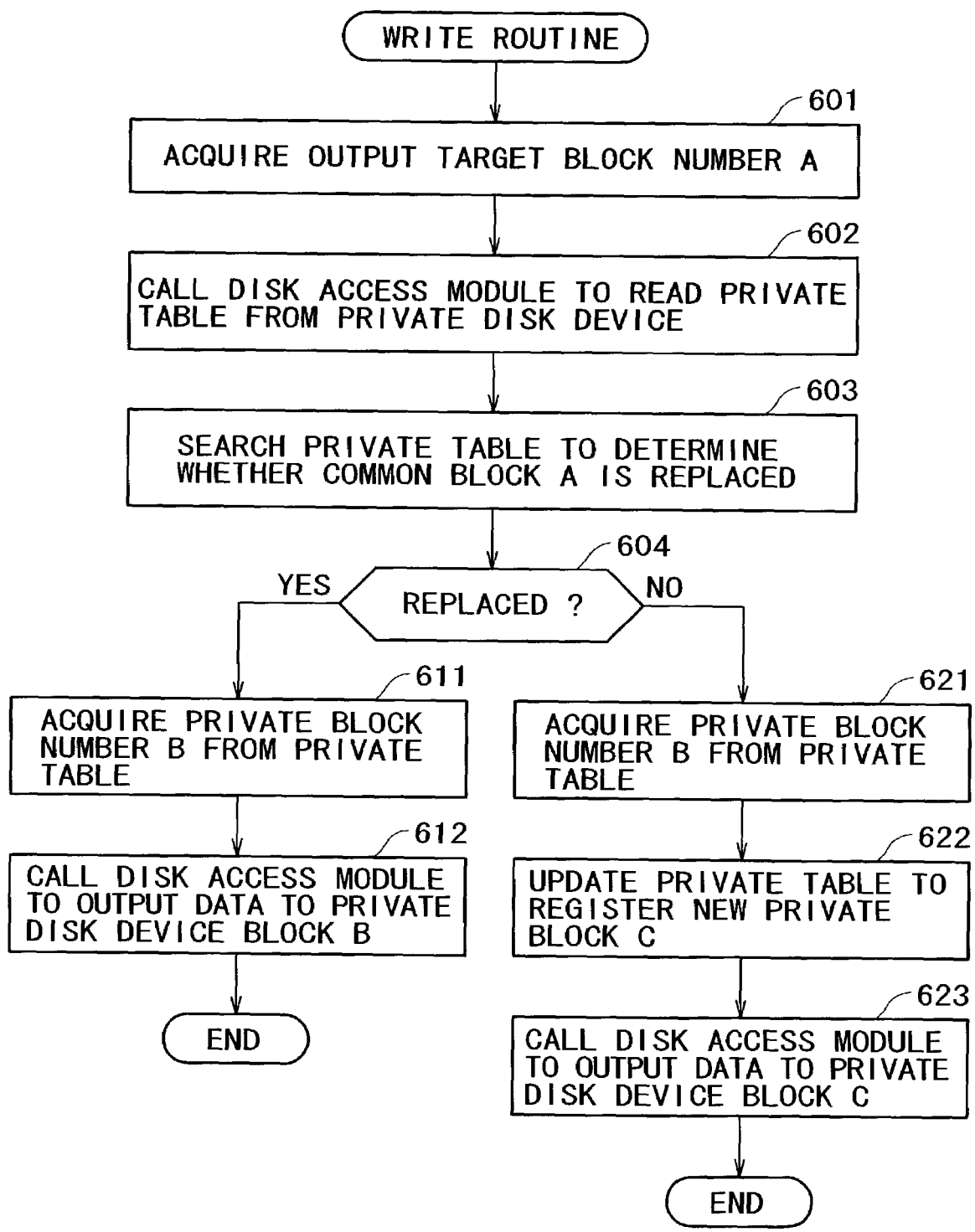
FIG. 6 shows a write routine flowchart of a preferred embodiment of the present invention.

FIG. 6 shows a write routine flowchart. In step 601, block number A is acquired as the output target. Block number A is designated by a caller. In step 602, the disk access module 117 is called. As a result of this call, a private table 132 is read from a private disk device 130. In step 603, the private table 132 is searched. This search is conducted to determine whether output target block A is replaced. More specifically, all entries in the private table 132 are checked. If an entry is found to have a validity flag value of 1 and a common block number of A, it means that block A is replaced. In step 604, a branch occurs in accordance with the judgment result. The program branches to step 611 when block A is replaced. If not, the program branches to step 621. In step 611, private block B is acquired. The block number of private block B is the private block number of an entry that was retrieved by a search in step 603. In step 612, the disk access module 117 is called. As a result of this call, data is written into block B of the private disk device 130. In step 621, the private table 132 is searched. As a result of this search, unused private block C is acquired. More specifically, all entries in the private table 132 are checked to acquire private block number C of the first entry that is found to have a validity flag value of 1. In step 622, the private table 132 is updated. New private block C is registered by this update. More specifically, the entries having a private block number of C in the private table 132 are set to a validity flag value of 1 and a common block number of A, and then the disk access module 117 is called to reflect the results in the private table within the private disk device. In step 623, the disk access module 117 is called. As a result of this call, data is written into block C of the private disk device 130.

In the preferred embodiment, data is shared when the disk devices are shared by multiple virtual machines on a host computer. However, the present invention is also applicable to situations where the disk devices are shared by multiple host computers.

In the preferred embodiment, the private disk devices are separate from the common disk device. However, the present invention is also applicable to situations where these disk devices virtually exist on volumes that are obtained by logically dividing a physical disk device.

In the preferred embodiment, virtual machines and disk devices are used to implement the present invention within the software on the virtual machines. However, the present invention is also applicable to the control software in a NAS or network file server when the NAS or network file server is used instead of a disk device.

In the preferred embodiment, normal disk devices are used to implement the present invention within the software on virtual machines. However, the present invention is also applicable to situations where disk devices that run control software on a processor and memory they have.

In another preferred embodiment, a single computer that is connected to one or more of the above private disk devices, furnished with one or more network connections, and provided with a read routine, a write routine, and disk access module can be used instead of multiple computers mentioned above. In another preferred embodiment, a single computer that is connected to one or more of the above private disk devices, furnished with one or more channels for connecting itself to the other computers as a disk device, and provided with a read routine, a write routine, and disk access module can be used instead of multiple computers mentioned above.

As explained above, the preferred embodiments permit a part of a disk to be shared by multiple computers so as to reduce the cost of hardware. Further, the present invention does not duplicate common data when they store in files. As a result, the amount of data to be backed up decreases, thereby reducing the time required for backup and the cost of operations. When the present invention is applied to system disks, their common portions can be shared to reduce the required capacity and provide increased ease of management.

According to the present invention, disks can be partly shared no matter whether they are system disks or user disks.

The foregoing invention has been described in terms of preferred embodiments. However, those skilled, in the art will recognize that many variations of such embodiments exist. Such variations are intended to be within the scope of the present invention and the appended claims.

What is claimed is:

1. An information processing system comprising:
   computers connected to respective private disk devices; and
   a common disk device commonly connected to the computers including common blocks for storing data that is to be shared by said computers;
   wherein each of said computers includes;
   a first means for storing update data for data blocks selected from said common blocks of said common disk device in private blocks formed on an associated private disk device, and for forming in an associated private disk device a private table indicating correspondence between identification numbers of said selected common blocks and identification numbers of said private blocks replacing data of said selected common blocks; and
   a second means for translating a data reference of said common disk device into a data reference of one of said private disk devices when said one private disk device is found to store update data for a data block that is referred to.

2. The information processing system according to claim 1,
   wherein said first means checks said private tables to determine whether a common block to be updated is replaced by preceding update data stored in an associated private block, and updates said associated block with new update data if the common block is replaced, or stores said new update data in a new private block, and updates said private tables if the common block is not replaced; and said second means checks said private tables to determine whether any of said private blocks contains the data that is referred to, and references a private block containing the data, or references said common blocks if the data to refer to is not found in any of said private blocks.

3. The information processing system according to claim 1 wherein said computers are virtual machines that are implemented virtually by means of software or hardware on a host computer.

4. The information processing system according to claim 1 wherein logical volumes on said common disk store the contents of said private disk devices and said common disk device.

5. The information processing system according to claim 1 further comprising another common disk device having the same configuration as said common disk device.

6. The information processing system according to claim 1 further comprising a means for backing up the contents of said common disk devices and the contents of some of said private disk devices.

7. An information processing system comprising:
   computers;
   private disk devices each storing data unique to each of said computers; and
   a common disk device including common blocks for storing data common to the computers, wherein each of said computers is network-connected to one or more private disk devices and said common disk device;
   wherein each of the computers further includes;
   a first means for storing update data for data blocks selected from said common blocks of said common disk device and data update information for said common disk device on said private disks; and
   a second means for translating a data reference made of said common disk device into a data reference of one of said private disk devices when said one private disk device is found to store said update data for a data block that is referred to.

8. An information processing system comprising:
   computers;
   private disk devices, each storing data unique to each of said computers; and
   a common disk device including common blocks for storing data common to the computers, wherein each of said computers is connected to one or more of said private disk devices;
   and wherein each of the computers further includes;
   one or more channels for connecting said one computer to other computers while handling said one computer as a disk device;
   a first means for storing update data for data blocks selected from said common blocks of said common disk device and data update information for said common disk device on said private disks; and
   a second means for translating a data reference made of said common disk device into a data reference of one of said private disk devices when said one private disk device is found to store said update data for a data block that is referred to.

* * * * *